(12) United States Patent
Nakagawa (10) Patent No.: US 12,446,561 B2
(45) Date of Patent: Oct. 21, 2025

(54) REAR GRIP STRUCTURE FOR FISHING ROD

(71) Applicant: GLOBERIDE, Inc., Higashikurume (JP)

(72) Inventor: Shintaro Nakagawa, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/696,215

(22) PCT Filed: Oct. 27, 2022

(86) PCT No.: PCT/JP2022/040048
§ 371 (c)(1),
(2) Date: Mar. 27, 2024

(87) PCT Pub. No.: WO2023/119858
PCT Pub. Date: Jun. 29, 2023

(65) Prior Publication Data
US 2024/0389566 A1  Nov. 28, 2024

(30) Foreign Application Priority Data
Dec. 24, 2021 (JP) ................. 2021-211403

(51) Int. Cl.
*A01K 87/08* (2006.01)
(52) U.S. Cl.
CPC .................... *A01K 87/08* (2013.01)
(58) Field of Classification Search
CPC .... A01K 87/08; A01K 87/008; A01K 87/009;
A01K 87/02; A01K 87/00; A01K 87/04;
F16B 7/04; F16B 7/0406; F16B 7/0413;
F16B 7/042; F16B 21/06; F16B 21/07;
F16B 21/08; F16B 21/086; Y10T 403/4991
See application file for complete search history.

(56) References Cited

FOREIGN PATENT DOCUMENTS

| CA | 2612948 A1 | * | 6/2008 | ............. A01K 87/08 |
|---|---|---|---|---|
| CN | 112167193 A | * | 1/2021 | ........... A01K 87/007 |
| JP | H06-071400 B2 | | 9/1994 | |
| JP | H07-000061 U | | 1/1995 | |
| JP | H10-14453 A | | 1/1998 | |
| JP | 2001-204310 A | | 7/2001 | |
| JP | 2005-312400 A | | 11/2005 | |

(Continued)

OTHER PUBLICATIONS

KR-20180043505-A Translation (Year: 2018).*

(Continued)

*Primary Examiner* — Katelyn T Truong
(74) *Attorney, Agent, or Firm* — Oliff PLC (57) ABSTRACT

Provided is a rear grip structure of a fishing rod that enables improvement of the degree of freedom in design and increase in the bonding strength. A rear grip structure of a fishing rod comprising a rod 2 and a grip body 1, wherein the grip body 1 comprises: a main body portion 10 comprising an enlarged diameter portion (first enlarged diameter portion 10*b*, second enlarged diameter portion 10*c*) whose diameter increases with distance from the rod 2; and a first insertion portion 11 extending from the main body portion 10 toward the rod 2 and bonded to an inner peripheral surface of the rod 2.

3 Claims, 9 Drawing Sheets (56) References Cited

FOREIGN PATENT DOCUMENTS

| | | | | | |
|---|---|---|---|---|---|
| JP | 2008-011703 | A | | 1/2008 | |
| JP | 2016077254 | A | * | 5/2016 | ............. A01K 87/08 |
| JP | 2020-103227 | A | | 7/2020 | |
| JP | 2022121083 | A | * | 8/2022 | ............. A01K 87/06 |
| KR | 19990009535 | U | * | 3/1999 | |
| KR | 20150002885 | U | * | 7/2015 | |
| KR | 101566653 | B1 | * | 11/2015 | |
| KR | 10-2016-0062969 | A | | 6/2016 | |
| KR | 20180043505 | A | * | 4/2018 | |

OTHER PUBLICATIONS

KR-20150002885-U Translation (Year: 2015).*
CN-112167193-A Translation (Year: 2021).*
KR-101566653-B1 Translation (Year: 2015).*
JP-2016077254-A Translation (Year: 2016).*
JP-2022121083-A Translation (Year: 2022).*
CA-2612948-A1 Text (Year: 2008).*
KR-19990009535-U Translation (Year: 1999).*
Dec. 27, 2022 International Search Report issued in International Patent Application No. PCT/JP2022/040048.
Feb. 19, 2025 Examination Report issued in Australian Patent Application No. 2022423457.
Mar. 11, 2025 Office Action issued in Japanese Patent Application No. 2021-211403.
Jun. 20, 2024 International Preliminary Report on Patentability issued in International Patent Application No. PCT/JP2022/040048.
Aug. 17, 2025 Office Action issued in Chinese Patent Application No. 202280067042.X.

* cited by examiner

REAR GRIP STRUCTURE FOR FISHING ROD

TECHNICAL FIELD

Cross Reference

The present application claims priority based on Japanese Patent Application No. 2021-211403 (filed on Dec. 24, 2021), the contents of which are incorporated herein by reference in their entirety.

The present invention relates to a rear grip structure of a fishing rod.

BACKGROUND ART

A rear grip structure of a fishing rod configured by inserting a hollow portion of a grip body onto an outer peripheral surface of a rod has been known (see, for example, FIG. 3 of Patent Literature 1). In the rear grip structure of a fishing rod of the related art, for example, the outer peripheral surface of the rod and an inner peripheral surface of the grip body are bonded and coupled to each other.

CITATION LIST

Patent Literature

Patent Literature 1: JP 2020-103227 A

SUMMARY OF INVENTION

Technical Problem

The rear grip structure of a fishing rod has a problem that when the grip body is gripped, a large force is applied on a joint portion between the rod tip side of the grip body and the rod, and the joint portion is likely to be detached. Although it is conceivable to increase the bonded area between the grip body and the rod in order to increase the bonding strength, there is a problem that the grip body is increased in size and weight, and the degree of freedom in design is reduced.

The present invention has been made to solve the above problems, and an object of the present invention is to provide a rear grip structure of a fishing rod capable of improving the degree of freedom in design and increasing a bonding strength.

Solution to Problem

A rear grip structure of a fishing rod according to the present invention comprises a rod and a grip body, in which the grip body comprises: a main body portion comprising an enlarged diameter portion whose diameter increases with distance from the rod; and a first insertion portion extending from the main body portion toward the rod and bonded to an inner peripheral surface of the rod.

According to the present invention, the inner peripheral surface of the rod and the first insertion portion of the grip body are bonded to each other, and the main body portion of the grip body is exposed to the outside of the rod. As a result, the bonding strength can be secured by the length of the first insertion portion, and the degree of freedom in design such as size, shape, design, and the like portion can be increased by the main body portion. In addition, since the main body portion comprises the enlarged diameter portion which increases in diameter as the main body separates from the rod, the gripping property can be increased.

Preferably, the grip body is hollow. According to the present invention, the weight of the grip body can be reduced.

In addition, it is preferable that the grip body is hollow and comprises an opening that opens toward a rod base side, and further comprises a rod plug having a base portion to be inserted into the grip body and a second insertion portion extending from the base portion and bonded to an inner peripheral surface of the first insertion portion.

According to the present invention, the bonding strength between the rod and the grip body can be further increased by inserting the rod plug through the opening of the grip body and inserting the second insertion portion of the rod plug into the first insertion portion.

In addition, it is preferable to comprise a protective ring that protects the opening of the grip body. According to the present invention, it is possible to prevent the grip body from being damaged when the grip body comes into contact with the ground or the like.

It is preferable that the base portion of the rod plug is formed to be larger in diameter than the rod, and a rod plug opening opened laterally is formed.

According to the present invention, the weight of the rod plug can be reduced.

The grip body preferably has a grip opening that opens laterally. According to the present invention, by providing the grip opening, the gripping property can be improved, and the weight reduction of the grip body can be further enhanced.

Preferably, the grip body is solid. According to the present invention, the durability of the grip body can be improved.

Preferably, the grip body comprises a recessed groove being formed. According to the present invention, the gripping property can be improved, and the weight of the grip body can be reduced.

Advantageous Effects of Invention

According to the present invention, it is possible to provide a rear grip structure of a fishing rod that enables improvement of the degree of freedom in design and increase in the bonding strength.

DESCRIPTION OF EMBODIMENTS

First Embodiment

Hereinafter, a first embodiment of a rear grip structure of a fishing rod (hereinafter, simply referred to as a "rear grip structure") of the present invention will be described with reference to the accompanying drawings. Note that in the description of the drawings, the same element is denoted by the same reference sign, and a duplicate description is appropriately omitted. In the following description, "front-rear", "left-right", and "up-down" conform to the arrows in FIGS. 1 and 3A. The direction is used for convenience of description, and does not limit the direction of the present invention. The rear grip structure of the present invention comprises a "composite type rear grip structure" comprising a plurality of members and a "single type rear grip structure" comprising a single member. First, the composite type rear grip structure will be described.

<Composite Type Rear Grip Structure>

Figure 1:
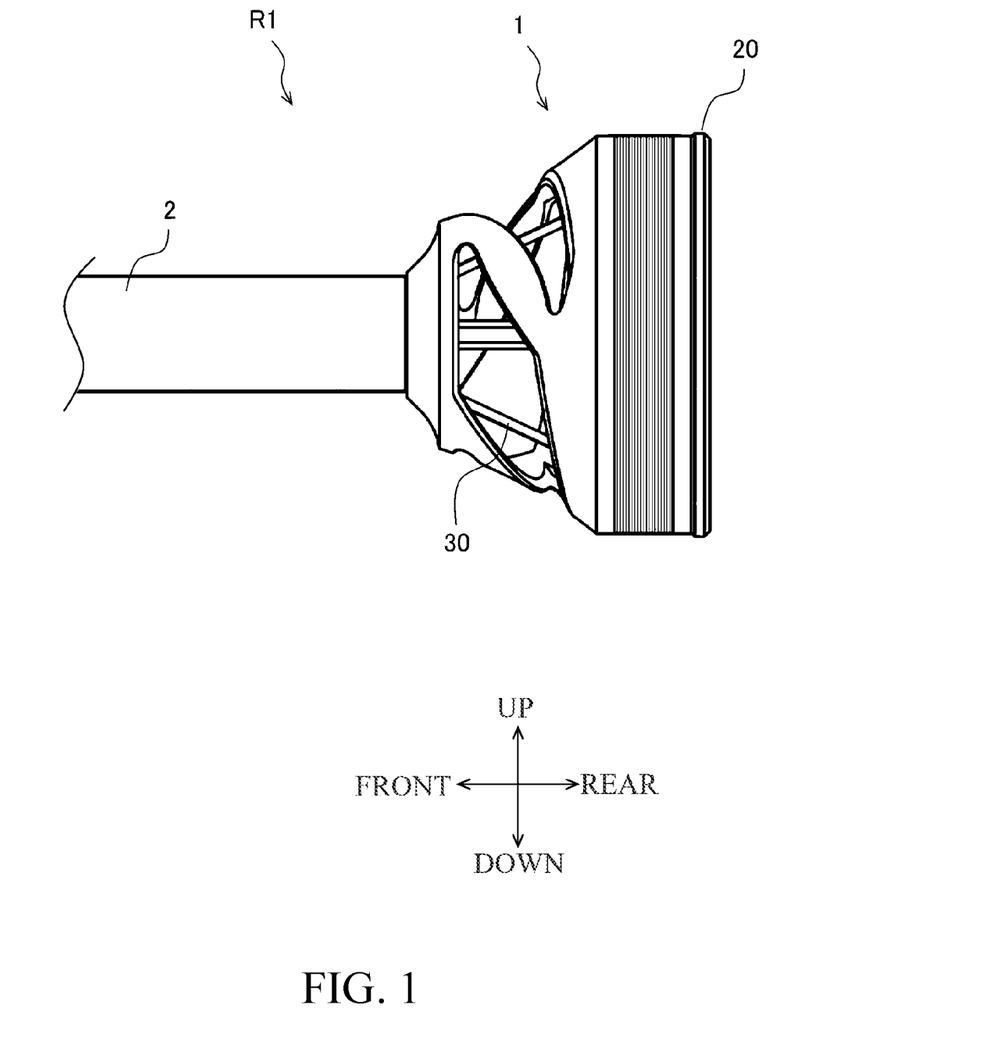
FIG. 1 is a side view illustrating a rear grip structure according to a first embodiment of the present invention.
Figure 2:
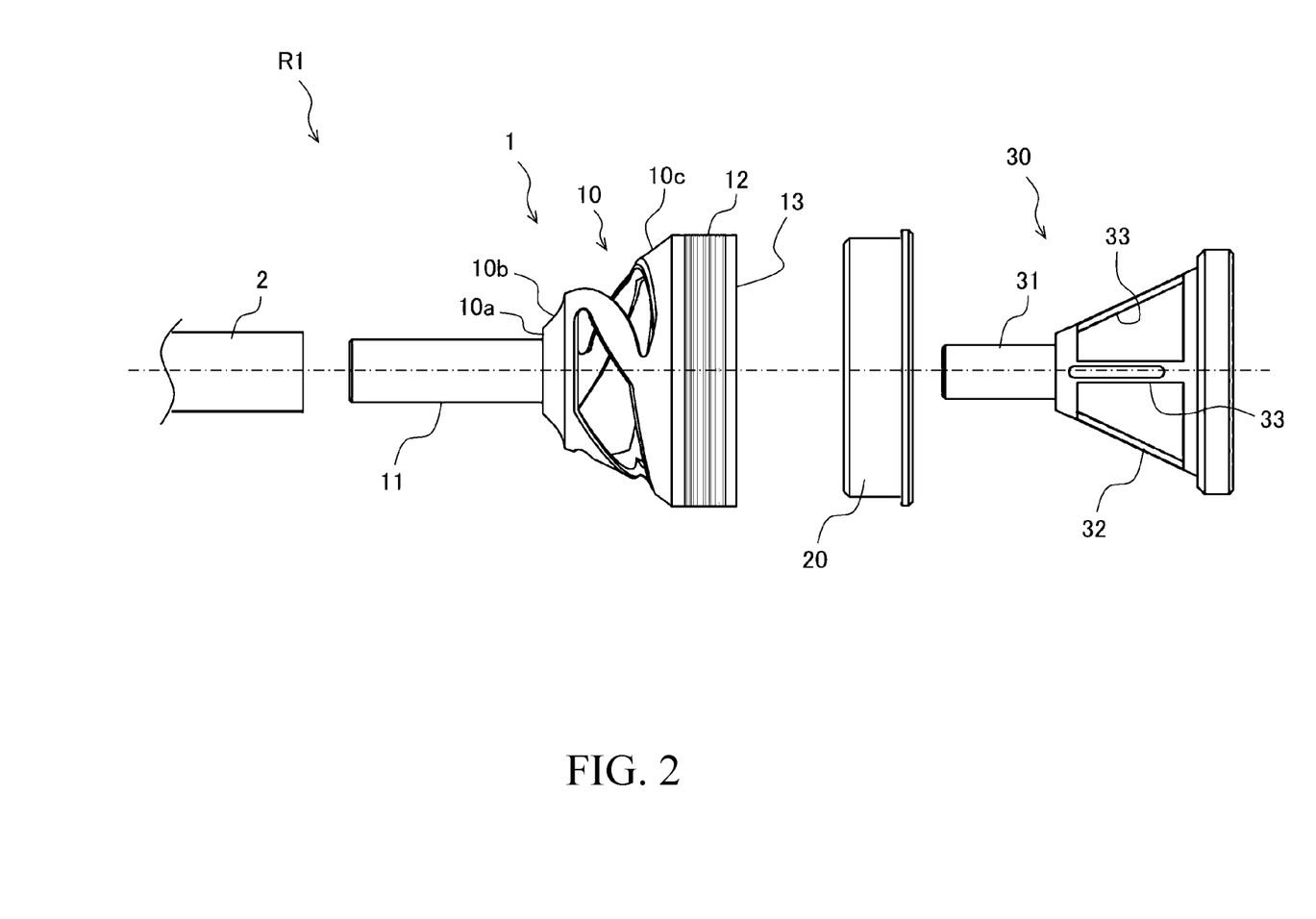
FIG. 2 is an exploded side view illustrating each configuration of the rear grip structure according to the first embodiment.

As illustrated in FIGS. 1 and 2, a rear grip structure R1 comprises a grip body 1, a rod 2, a protective ring 20, and a rod plug 30. The rod 2 is a cylindrical member as a main body of a fishing rod. The rod 2 may be composed of a single rod or may have a joint structure composed of a plurality of rods.

As illustrated in FIG. 2, the grip body 1 of the present embodiment is hollow and comprises a main body portion 10, a first insertion portion 11, and a large-diameter portion 12. The grip body 1 can be made of resin or metal, but is not limited thereto.

Figure 3A:
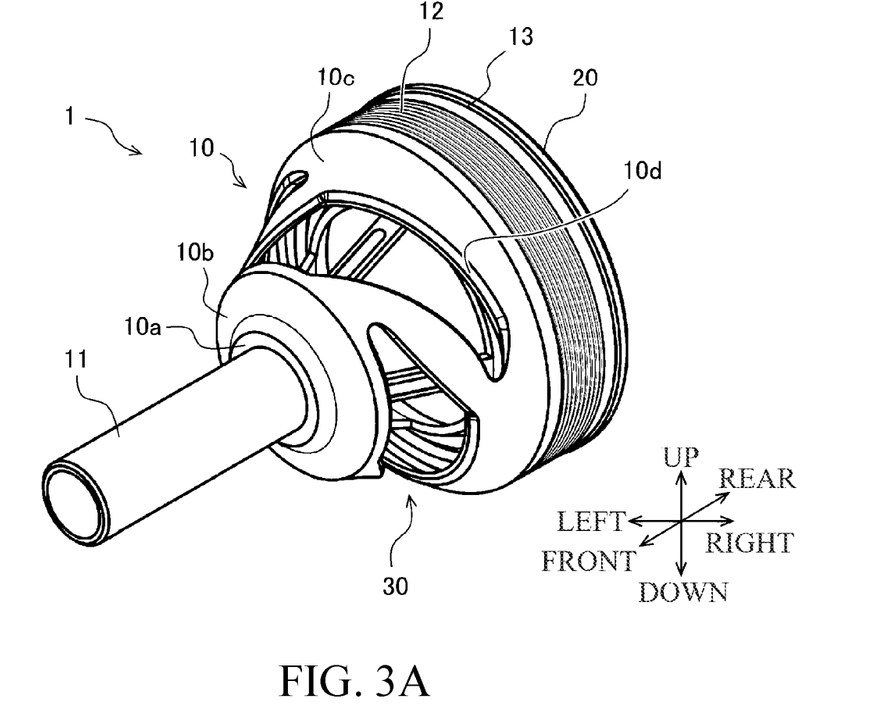
FIG. 3A is a perspective view illustrating a grip body and a rod plug according to the first embodiment.
Figure 3B:
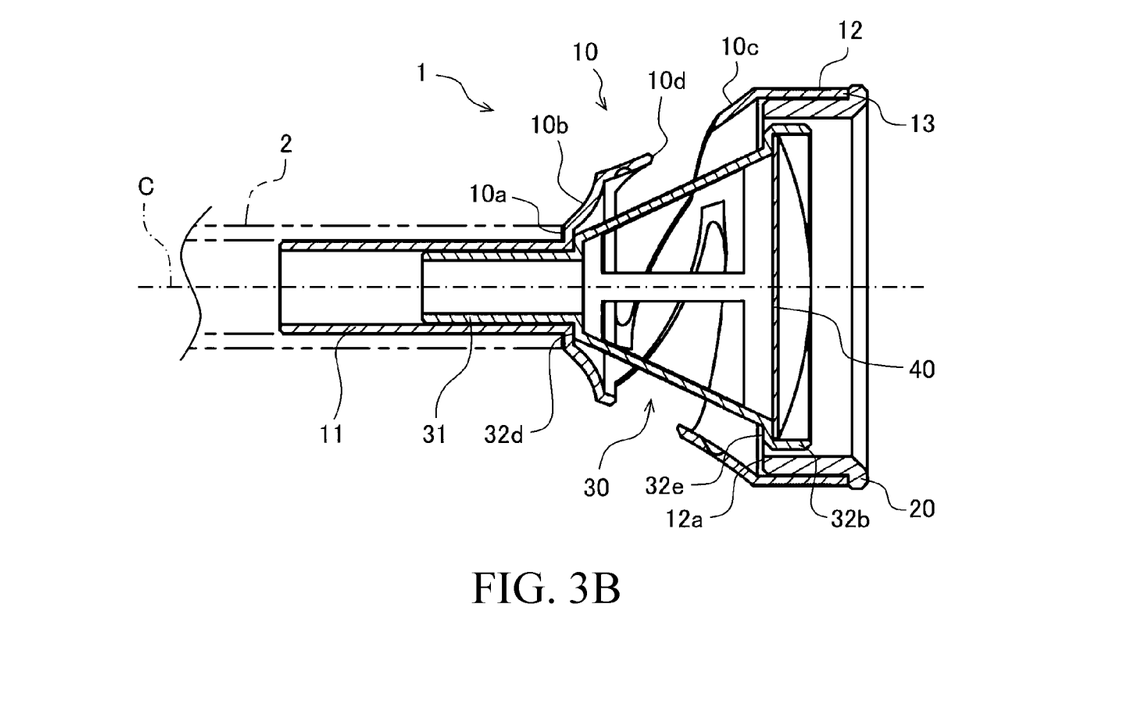
FIG. 3B is a side cross-sectional view illustrating the grip body and the rod plug according to the first embodiment.

As illustrated in FIGS. 3A and 3B, the main body portion 10 has a substantially truncated cone shape, and comprises a receiving portion 10a, a first enlarged diameter portion 10b, and a second enlarged diameter portion 10c. The receiving portion 10a projects perpendicularly from a proximal end of the first insertion portion 11 in a radially outward direction. The receiving portion 10a is a portion with which the proximal end of the rod 2 abuts. The outer diameter of the receiving portion 10a is substantially the same as the outer diameter of the rod 2.

The first enlarged diameter portion 10b is a portion that is continuous with the receiving portion 10a and that is enlarged in diameter as the portion extends away from the first insertion portion 11. The first enlarged diameter portion 10b may be a flat surface, but in the present embodiment, is formed as a curved surface that is slightly recessed toward an axis C. The second enlarged diameter portion 10c is a portion that is continuous with the first enlarged diameter portion 10b and that is enlarged in diameter as the portion extends away from the first insertion portion 11. The second enlarged diameter portion 10c may be a flat surface, but in the present embodiment, is formed as a curved surface that is slightly recessed toward the axis C. An inclination angle of the second enlarged diameter portion 10c with respect to the axis C is smaller than an inclination angle of the first enlarged diameter portion 10b with respect to the axis C. A length of the second enlarged diameter portion 10c in the direction of the axis C is longer than a length of the first enlarged diameter portion 10b in the direction of the axis C.

Grip openings 10d that are open laterally are formed in the second enlarged diameter portion 10c. The shape and number of the grip openings 10d are not particularly limited, and in the present embodiment, three openings that are cut obliquely in a circumferential direction are formed.

The first insertion portion 11 extends from the main body portion 10 toward a rod 2 side (see FIG. 1), and has a cylindrical shape. The first insertion portion 11 is a portion inserted into the rod 2, and is formed with a smaller diameter than an inner diameter of the rod 2. An outer peripheral surface of the first insertion portion 11 and an inner peripheral surface of the rod 2 are bonded to each other with an adhesive. Note that the first insertion portion 11 of the present embodiment has a cylindrical shape; however, the first insertion portion 11 may be appropriately changed to match the shape of an inner space of the rod 2.

The large-diameter portion 12 extends continuously from the main body portion 10 toward a rod base side, and has a cylindrical shape. The large-diameter portion 12 comprises an opening 13 that is open toward the rod base side. A plurality of fine recessed grooves are formed on an outer peripheral surface of the large-diameter portion 12 over the circumferential direction. The recessed grooves may be omitted; however, the grip force can be increased by providing the recessed grooves. A projecting portion 12a projecting toward the axis C is formed on an inner peripheral surface of the large-diameter portion 12. The protective ring 20 is attached to a peripheral edge of the opening 13. The protective ring 20 has a cylindrical shape, and is configured as a resin member, a metal member, a soft member, or the like. The protective ring 20 is fitted to the inner peripheral surface of the large-diameter portion 12 and covers the end of the large-diameter portion 12 in the circumferential direction.

Figure 4A:
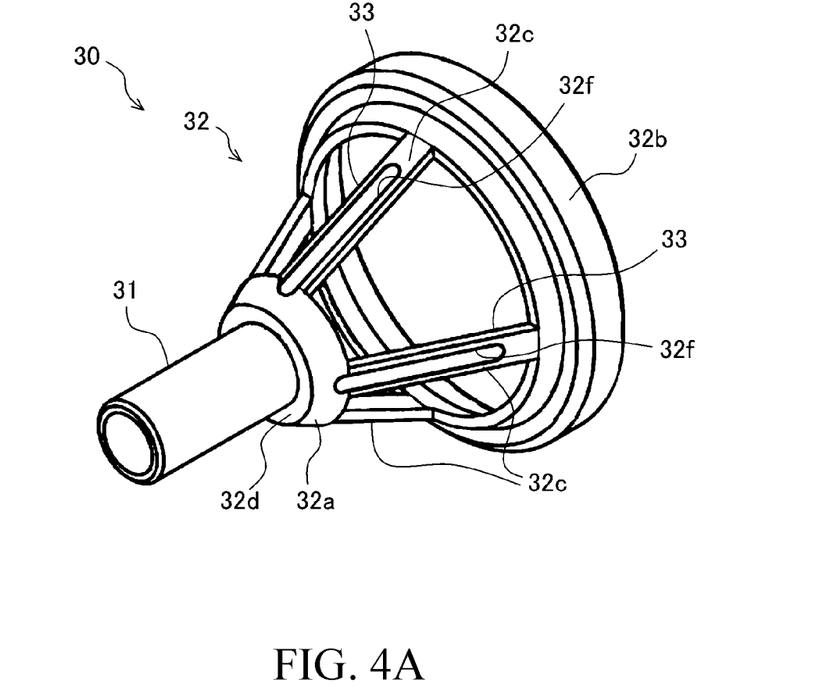
FIG. 4A is a perspective view illustrating the rod plug according to the first embodiment.
Figure 4B:
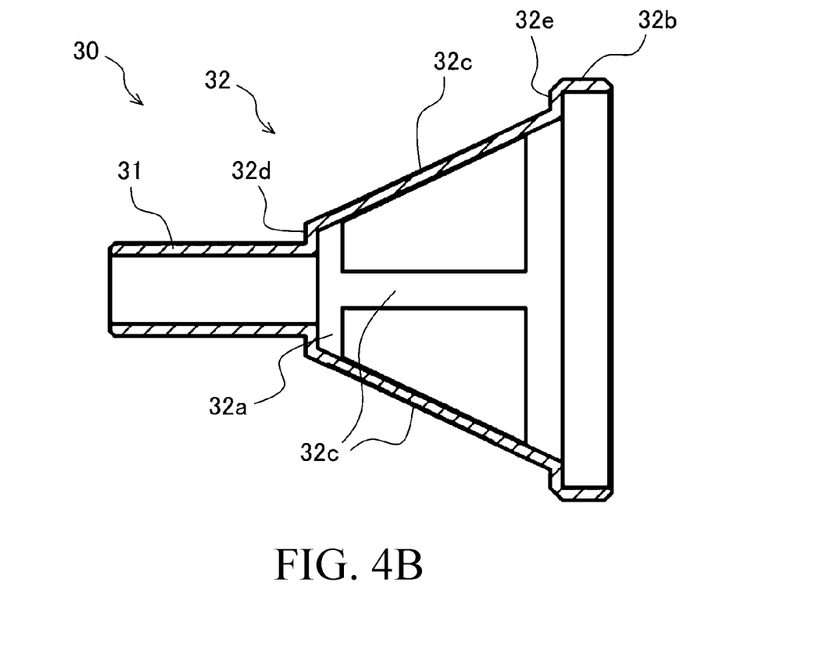
FIG. 4B is a side cross-sectional view illustrating the rod plug according to the first embodiment.

As illustrated in FIGS. 4A and 4B, the rod plug 30 is hollow and comprises a second insertion portion 31 and a base portion 32. The second insertion portion 31 extends forward from the base portion 32, and has a cylindrical shape. The second insertion portion 31 is formed with a smaller diameter than an inner diameter of the first insertion portion 11 (refer to FIG. 3A). An outer peripheral surface of the second insertion portion 31 is bonded to an inner peripheral surface of the first insertion portion 11 with an adhesive. A length of the second insertion portion 31 may be appropriately set depending on the bonding strength, and in the present embodiment, is shorter than a length of the first insertion portion 11.

The base portion 32 is formed to be continuous with the second insertion portion 31, and has a substantially truncated cone shape. The base portion 32 is formed with a larger diameter than that of the rod 2. The base portion 32 comprises a base small-diameter portion 32a that is continuous with the second insertion portion 31; a base large-diameter portion 32b formed with a larger diameter than that of the base small-diameter portion 32a; and four base body portions 32c connecting the base small-diameter portion 32a and the base large-diameter portion 32b. The base small-diameter portion 32a has an annular shape, and is formed with a larger diameter than that of a proximal end of the second insertion portion 31. A step portion 32d projecting in the radially outward direction is formed by the second insertion portion 31 and the base small-diameter portion 32a. The base large-diameter portion 32b has a cylindrical shape, and is formed to be continuous with the base body portions 32c. An outer diameter of the base large-diameter portion 32b is smaller than an inner diameter of the protective ring 20. A step portion 32e projecting in the radially outward direction is formed by the base body portions 32c and the base large-diameter portion 32b.

The base body portions 32c are plate-shaped portions connecting the base small-diameter portion 32a and the base large-diameter portion 32b. Groove portions 32f are formed on the surfaces of the base body portions 32c along an extending direction. The strength of the base body portions 32c can be increased by providing the groove portions 32f. Ribs may be provided instead of the groove portions 32f, or the groove portions 32f may be omitted. A rod plug opening 33 that is open laterally is formed between the base body portions 32c and 32c adjacent to each other. The shape and number of the rod plug openings 33 are not limited; however, in the present embodiment, four openings having a substantially trapezoidal shape in a side view are formed.

Next, a method for assembling the rear grip structure R1 will be described. The following assembling method is one example, and the order of the steps may be changed as appropriate. As shown in FIG. 3B, first, the grip body 1 and the rod plug 30 are assembled. An adhesive is applied to the outer peripheral surface of the second insertion portion 31 of the rod plug 30, and the second insertion portion 31 of the rod plug 30 is inserted into the first insertion portion 11 of the grip body 1. At this time, the receiving portion 10a of the grip body 1 and the step portion 32d of the rod plug 30 come into contact with each other, and the projecting portion 12a of the grip body 1 and the step portion 32e of the rod plug 30 come into contact with each other. In addition, a lid plate 40 is attached to the inside of the base large-diameter portion 32b of the rod plug 30 with an adhesive or the like. Design or the like is applied to a rear surface (surface on the rod base side) of the lid plate 40.

Next, the protective ring 20 is attached to the inner peripheral surface of the large-diameter portion 12. Finally, an adhesive is applied to the outer peripheral surface of the first insertion portion 11 of the grip body 1, and the first insertion portion 11 is inserted into the rod 2 until a proximal end of the rod 2 touches the receiving portion 10a.

According to the rear grip structure R1 of the present embodiment described above, the inner peripheral surface of the rod 2 and the first insertion portion 11 of the grip body 1 are bonded to each other, and the main body portion 10 of the grip body 1 is exposed to the outside of the rod 2. As a result, the bonding strength can be secured by the length of the first insertion portion 11, and the degree of freedom in design such as size, shape, design, and the like can be increased by the main body portion 10. In addition, since the main body portion 10 comprises the enlarged diameter portion (the first enlarged diameter portion 10b and the second enlarged diameter portion 10c) which increases in diameter as the main body separates from the rod 2, the gripping property can be increased.

In addition, the first enlarged diameter portion 10b and the second enlarged diameter portion 10c have different inclination angles, and are thus easy to hold, excellent in design, and easy to press against a part of the body (elbow, arm, armpit, etc.). Further, since the grip body 1 is hollow, the weight of the grip body 1 can be reduced.

In addition, since the main body portion 10 is hollow and comprises the opening 13 opened to the rod base side, the rod plug 30 is inserted from the opening 13, and the second insertion portion 31 of the rod plug 30 is inserted into the first insertion portion 11, so that a double structure is formed, and the bonding strength between the rod 2 and the grip body 1 can be further enhanced. The rod plug 30 is provided with the step portions 32d and 32e, and abuts on the receiving portion 10a and the projecting portion 12a, so that the positioning in the insertion direction can be easily performed. Further, since the step portion 32e and the projecting portion 12a are brought into contact with each other, backlash between the grip body 1 and the rod plug 30 can also be prevented.

In addition, since the protective ring 20 for protecting the opening 13 is provided, it is possible to prevent the grip body 1 from being damaged when the grip body 1 comes into contact with the ground or the like.

In addition, the base portion 32 of the rod plug 30 is formed to have a diameter larger than that of the rod 2, and a rod plug opening 33 opened laterally is formed. This makes it possible to reduce the weight of the rod plug 30.

A grip opening 10d is formed laterally on the main body portion 10 of the grip body 1. As a result, the gripping property can be improved, and the weight reduction of the grip body 1 can be further enhanced.

(First Modification)

Figure 5:
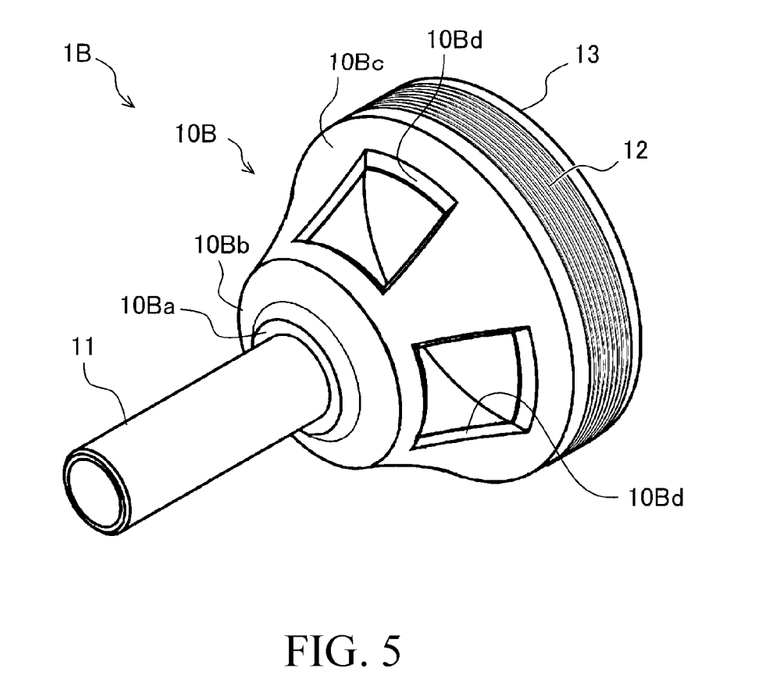
FIG. 5 is a perspective view illustrating a first modification of the grip body.

Next, as illustrated in FIG. 5, a grip body 1B according to a first modification will be described. A main body portion 10B of the grip body 1B is different from that of the first embodiment in the shape of a grip opening 10Bd. The grip opening 10Bd is formed in a rectangular shape in a second enlarged diameter portion 10Bc. A total of four grip openings 10Bd are formed in the circumferential direction of the main body portion 10B. Other configurations and effects are the same as those of the first embodiment, and thus description thereof is omitted.

(Second Modification)

Figure 6:
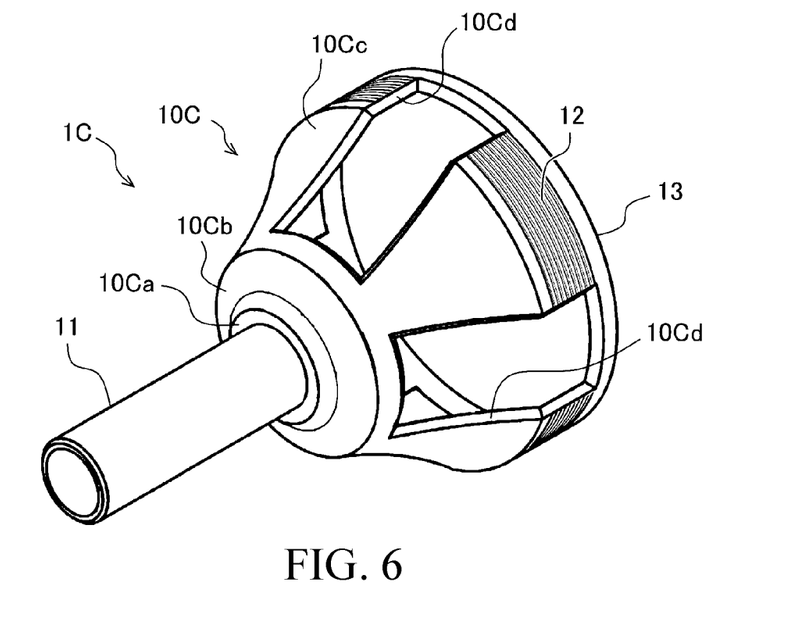
FIG. 6 is a perspective view illustrating a second modification of the grip body.

Next, as illustrated in FIG. 6, a grip body 1C according to a second modification will be described. A main body portion 10C of the grip body 1C is different from that of the first embodiment in the shape of a grip opening 10Cd. The grip opening 10Cd is formed in a rectangular shape from the second enlarged diameter portion 10Cc to the large-diameter portion 12. A total of four grip openings 10Cd are formed in the circumferential direction of the main body portion 10C. Other configurations and effects are the same as those of the first embodiment, and thus description thereof is omitted.

As in the first and second modifications described above, the shape of the grip opening can be changed to reduce the weight and increase the design variation.

Second Embodiment

Figure 7A:
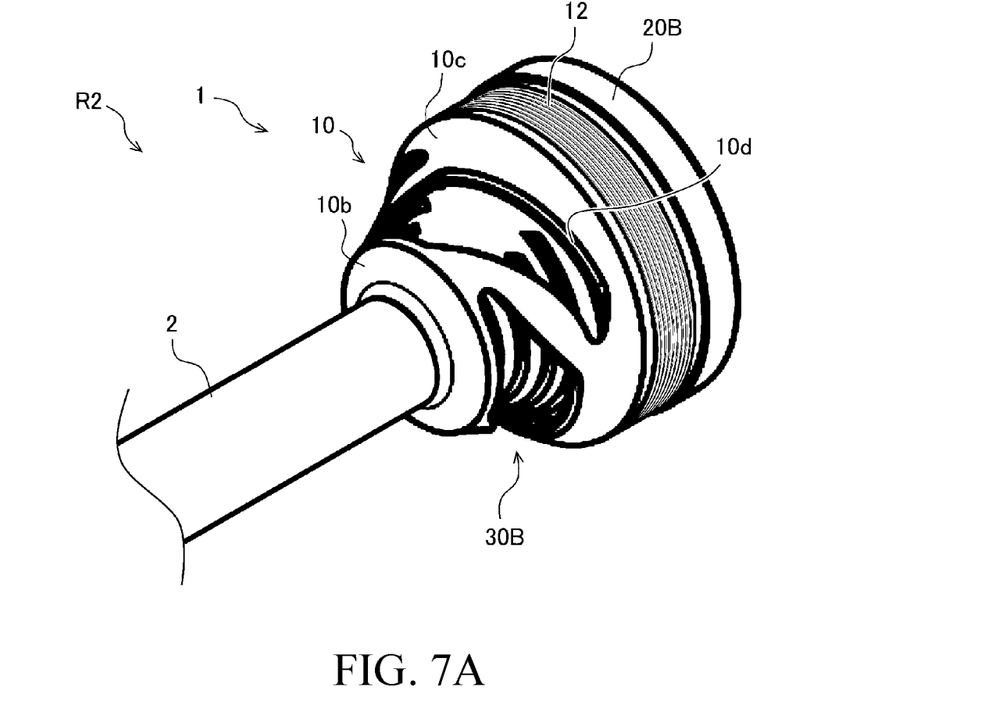
FIG. 7A is a perspective view illustrating a rear grip structure according to a second embodiment of the present invention.
Figure 7B:
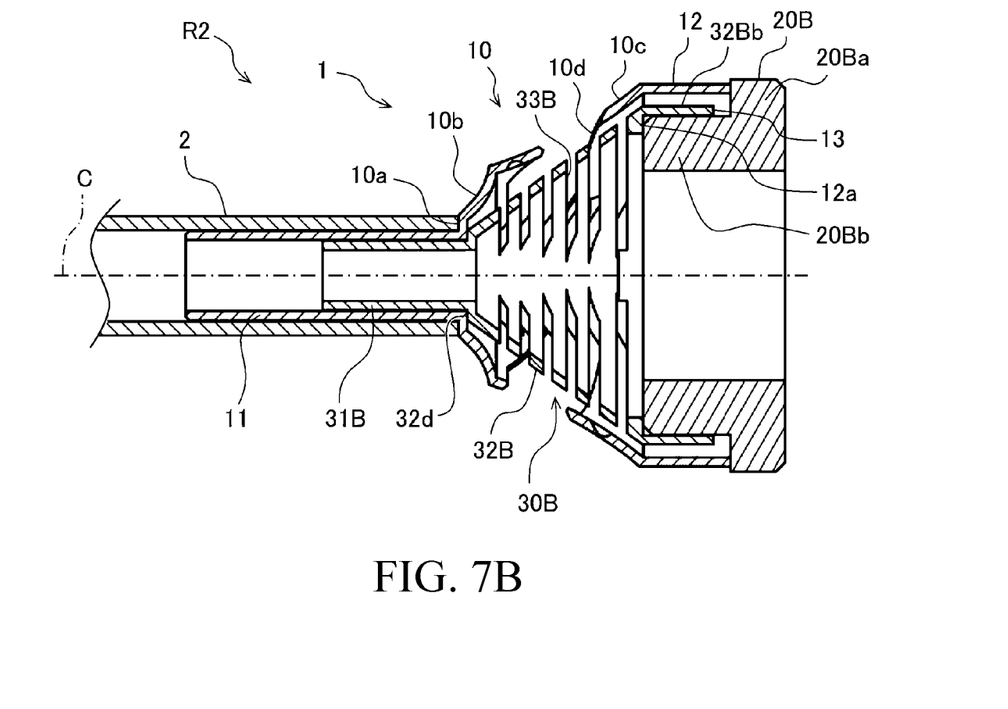
FIG. 7B is a side cross-sectional view illustrating the rear grip structure according to the second embodiment of the present invention.

Next, a rear grip structure according to a second embodiment of the present invention will be described. As shown in FIGS. 7A and 7B, the second embodiment is different from the first embodiment in the configurations of a protective ring 20B and a rod plug 30B attached to a main body portion 10. In a rear grip structure R2 according to the second embodiment, differences from the first embodiment will be mainly described.

As illustrated in FIGS. 7A and 7B, the protective ring 20B is configured to be thicker than that of the first embodiment. The protective ring 20B comprises a flange portion 20Ba and a shaft portion 20Bb vertically extending from the flange portion 20Ba. The shaft portion 20Bb is inserted into the inner peripheral surface of the base large-diameter portion 32Bb of the rod plug 30B.

The rod plug 30B comprises a second insertion portion 31B and a base portion 32B. In the present embodiment, a shape of a rod plug opening 33B formed in a base portion 32B is mainly different from that of the first embodiment. The rod plug opening 33B extends in a direction orthogonal to the axis C, and a plurality of the rod plug openings 33B are arranged in the axis C direction. The rod plug opening 33B is formed such that the width in the left-right direction increases toward the rear side.

The rear grip structure R2 described above can also achieve substantially the same effects as those of the first embodiment. Due to the protective ring 20B, the end portion of the large-diameter portion 12 and the base large-diameter portion 32Bb of the rod plug 30B can be protected. Further, as in the present embodiment, the size and shape of the rod plug 30B can be appropriately formed according to the application.

Third Embodiment

Figure 8A:
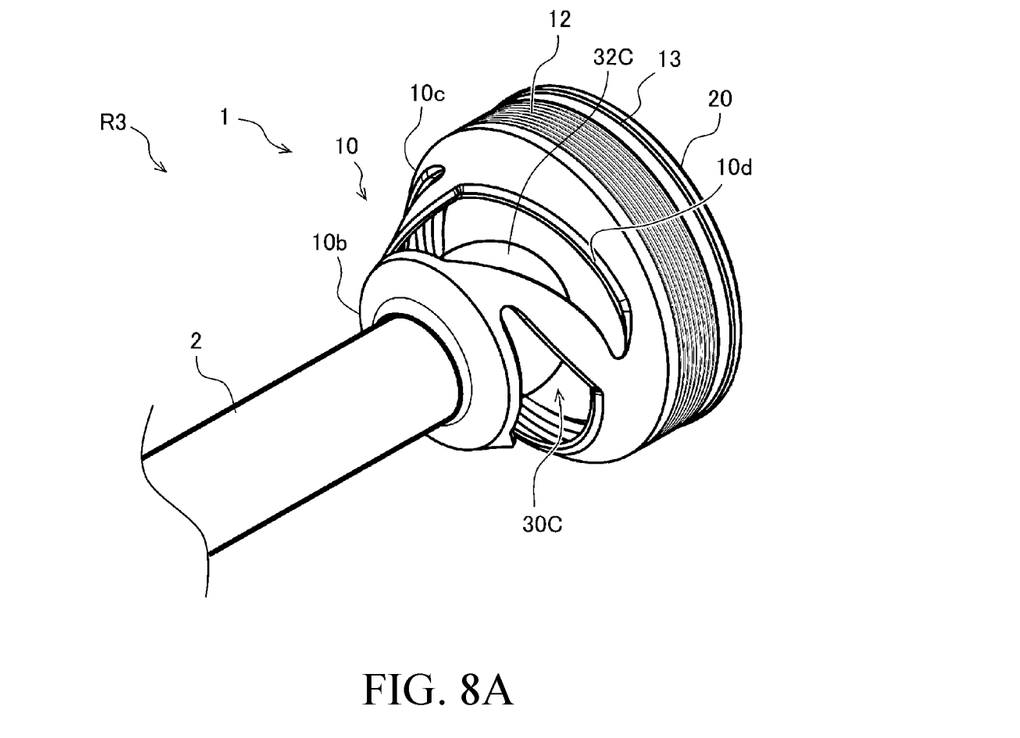
FIG. 8A is a perspective view illustrating a rear grip structure according to a third embodiment of the present invention.
Figure 8B:
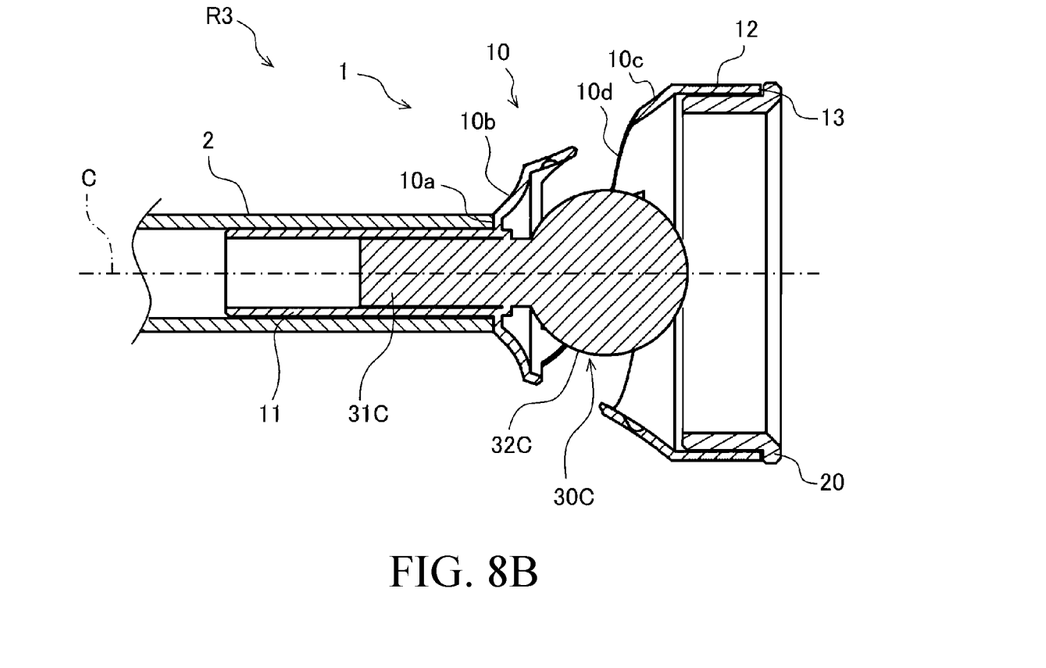
FIG. 8B is a side cross-sectional view illustrating the rear grip structure according to the third embodiment of the present invention.

Next, a rear grip structure according to a third embodiment of the present invention will be described. As shown in FIGS. 8A and 8B, the third embodiment is different from the first embodiment in the configuration of a rod plug 30C attached to a main body portion 10. In a rear grip structure R3 according to the third embodiment, differences from the first embodiment will be mainly described.

As shown in FIGS. 8A and 8B, a rod plug 30C of the present embodiment is formed to be solid. The rod plug 30C comprises a second insertion portion 31C and a base portion 32C having a spherical shape. The outer diameter of the base portion 32C is larger than the inner diameter of the rod 2.

The rear grip structure R3 described above can also achieve substantially the same effects as those of the first embodiment. In addition, the hollow grip body 1 achieves weight reduction, and the solid rod plug 30C being provided can improve durability of the rear grip structure R3. The rod plug 30C may also be hollow.

Fourth Embodiment

Figure 9A:
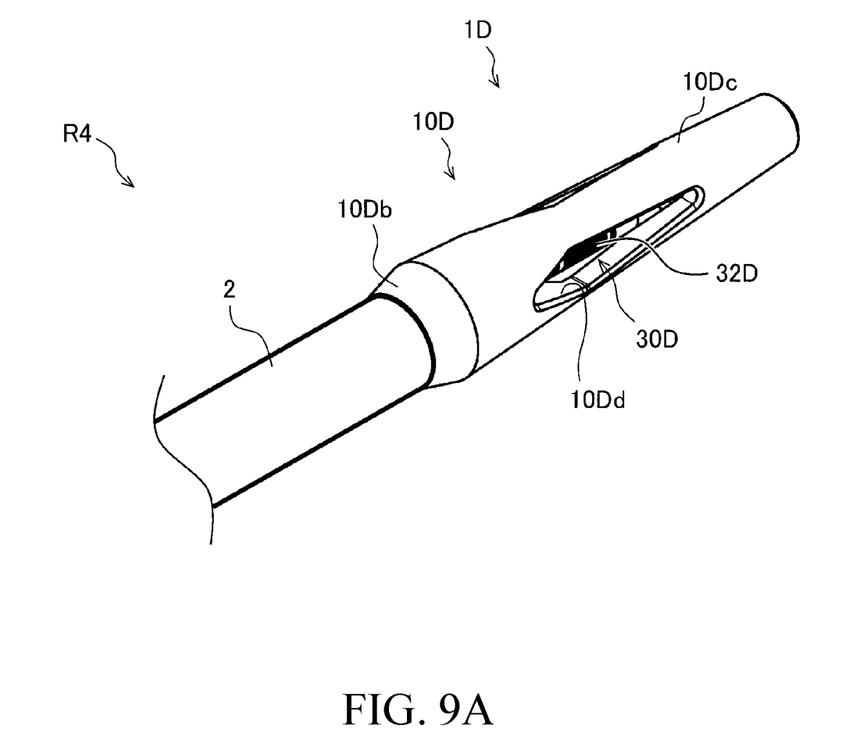
FIG. 9A is a perspective view illustrating a rear grip structure according to a fourth embodiment of the present invention.
Figure 9B:
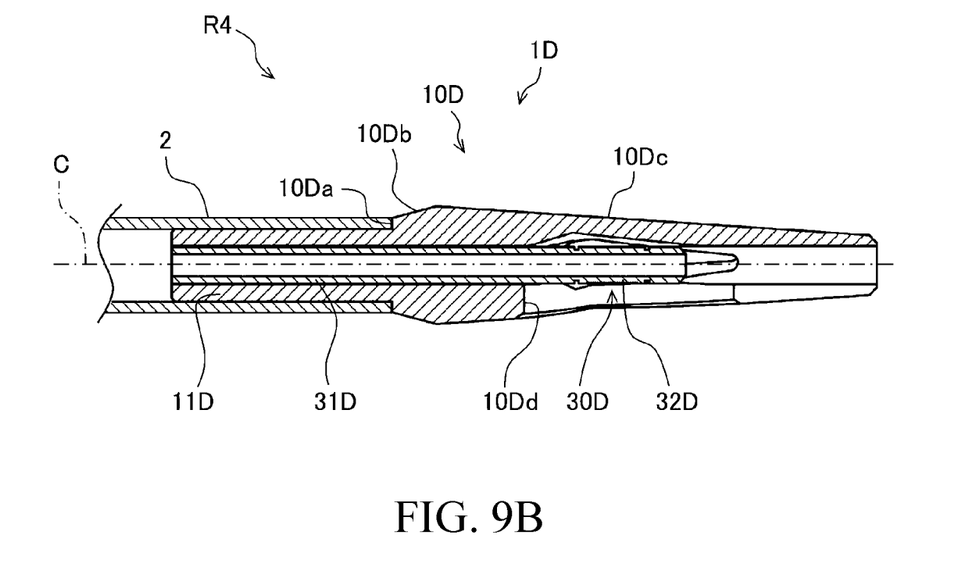
FIG. 9B is a side cross-sectional view illustrating the rear grip structure according to the fourth embodiment of the present invention.

Next, a rear grip structure according to a fourth embodiment of the present invention will be described. As shown in FIGS. 9A and 9B, the fourth embodiment is different from the first embodiment in the configurations of a main body portion 10D and a rod plug 30D inserted into the main body portion 10D. In a rear grip structure R4 according to the fourth embodiment, differences from the first embodiment will be mainly described.

As illustrated in FIGS. 9A and 9B, the grip body 1D of the present embodiment comprises a hollow main body portion 10D and a first insertion portion 11D extending from the main body portion 10D toward the rod 2. A rod plug 30D is attached to a hollow portion of the main body portion 10D.

The main body portion 10D comprises a receiving portion 10Da, a first enlarged diameter portion 10Db, and a reduced diameter portion 10Dc. The receiving portion 10Da projects perpendicularly from a proximal end of the first insertion portion 11D in a radially outward direction. The receiving portion 10Da is a portion with which the proximal end of the rod 2 abuts. The outer diameter of the receiving portion 10Da is substantially the same as the outer diameter of the rod 2.

The first enlarged diameter portion 10Db is a portion that is continuous with the receiving portion 10Da and that is enlarged in diameter as the portion extends away from the first insertion portion 11D. The first enlarged diameter portion 10Db may be a curved surface recessed toward the axis C, but is formed as a flat surface in the present embodiment. The reduced diameter portion 10Dc is a portion continuous with the first enlarged diameter portion 10Db and reducing in diameter with distance from the first insertion portion 11D. The reduced diameter portion 10Dc may be a curved surface recessed toward the axis C, but is formed as a flat surface in the present embodiment. A length of the reduced diameter portion 10Dc in the direction of the axis C is longer than a length of the first enlarged diameter portion 10Db in the direction of the axis C. The rear end of the reduced diameter portion 10Dc is open.

Grip openings 10Dd that are open laterally are formed in the reduced diameter portion 10Dc. The shape and the number of grip openings 10Dd are not particularly limited, but in the present embodiment, three openings cut along the axis C direction are formed.

The rod plug 30D comprises a second insertion portion 31D extending toward the rod 2 side and a base portion 32D positioned inside the main body portion 10D. The rod plug 30D has a substantially cylindrical shape. An outer peripheral surface of the second insertion portion 31D is bonded to an inner peripheral surface of the first insertion portion 11D with an adhesive. The outer peripheral surface of the base portion 32D is bonded to the inner peripheral surface of the main body portion 10D with an adhesive.

The rear grip structure R4 described above can also achieve substantially the same effects as those of the first embodiment. As in the main body portion 10D of the present embodiment, a configuration comprising a reduced diameter portion 10Dc may be adopted.

In the first to fourth embodiments, both the grip opening and the rod plug opening may be omitted. The rod plug or the protective ring may be omitted.

Fifth Embodiment—Single Type Rear Grip Structure

Figure 10:
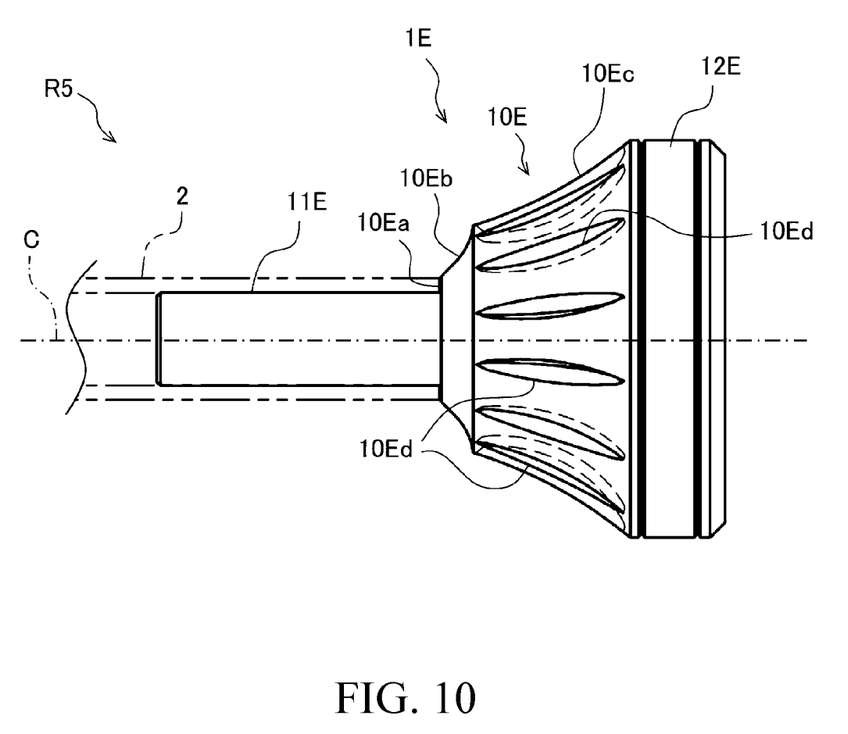
FIG. 10 is a side view illustrating a rear grip structure according to a fifth embodiment of the present invention.

Next, a single type rear grip structure according to a fifth embodiment of the present invention will be described. As shown in FIG. 10, the fifth embodiment is different from the first embodiment in the configuration of a main body portion 10E. The rear grip structure R5 according to the fifth embodiment is composed of a single member.

As illustrated in FIG. 10, the rear grip structure R5 comprises a grip body 1E and the rod 2. The grip body 1E of the present embodiment is solid and comprises a main body portion 10E, a first insertion portion 11E, and a large-diameter portion 12E. The grip body 1E can be made of rubber, resin or metal, but is not limited thereto.

The main body portion 10E has a substantially truncated cone shape, and comprises a receiving portion 10Ea, a first enlarged diameter portion 10Eb, and a second enlarged diameter portion 10Ec. The receiving portion 10Ea projects perpendicularly from a proximal end of the first insertion portion 11E in a radially outward direction. The receiving portion 10Ea is a portion with which the proximal end of the rod 2 abuts. The outer diameter of the receiving portion 10Ea is substantially the same as the outer diameter of the rod 2.

The first enlarged diameter portion 10Eb is a portion that is continuous with the receiving portion 10a and that is enlarged in diameter as the portion extends away from the first insertion portion 11E. The first enlarged diameter portion 10Eb may be a flat surface, but in the present embodiment, is formed as a curved surface that is slightly recessed toward an axis C. The second enlarged diameter portion 10Ec is a portion that is continuous with the first enlarged diameter portion 10Eb and that is enlarged in diameter as the portion extends away from the first insertion portion 11E. The second enlarged diameter portion 10Ec may be a flat surface, but in the present embodiment, is formed as a curved surface that is slightly recessed toward the axis C. An inclination angle of the second enlarged diameter portion 10Ec with respect to the axis C is smaller than an inclination angle of the first enlarged diameter portion 10Eb with respect to the axis C. A length of the second enlarged diameter portion 10Ec in the direction of the axis C is longer than a length of the first enlarged diameter portion 10Eb in the direction of the axis C.

The large-diameter portion 12E extends continuously from the main body portion 10E toward a rod base side, and has a columnar shape. The rear end of the large-diameter portion 12E is closed.

In the second enlarged diameter portion 10Ec, a recessed groove 10Ed that is recessed with respect to the surface is formed. The shape and the number of the recessed grooves 10Ed are not particularly limited, but in the present embodiment, the recessed groove has an elongated circular shape in the front-rear direction, and a plurality of the recessed grooves are formed over the circumferential direction of the second enlarged diameter portion 10Ec.

The rear grip structure R5 described above can also achieve substantially the same effects as those of the first embodiment. In addition, by providing the solid main body portion 10E, the durability of the grip body 1E can be improved. In addition, since the recessed grooves 10Ed are formed in the grip body 1E, the gripping property can be improved, and the weight of the grip body 1E can be reduced. In the rear grip structure R5, the recessed grooves 10Ed may be omitted. The grip body 1E may be hollow. This enables further weight reduction.

An embodiment according to the invention of the present application has been described above. The present invention is not limited to the embodiment described above, and respective components can be appropriately modified without departing from the spirit of the present invention. For example, the enlarged diameter portion has a two-stage configuration comprising the first enlarged diameter portion and the second enlarged diameter portion, but the present invention is not limited thereto, and there may be one or three or more enlarged diameter portions.

REFERENCE SIGNS LIST

R1 Rear grip structure
1 Grip body
2 Rod
10 Main body portion
10a Receiving portion
10b First enlarged diameter portion (enlarged diameter portion)
10c Second enlarged diameter portion (enlarged diameter portion)
11 First insertion portion
12 Large-diameter portion
13 Opening
20 Protective ring
30 Rod plug
31 Second insertion portion
32 Base portion
33 Rod plug opening

The invention claimed is:

1. A rear grip structure of a fishing rod comprising;
a rod;
a hollow grip body including:
    a main body portion comprising an enlarged diameter portion having a diameter that increases with distance from the rod;
    a first insertion portion extending from a first side of the main body portion toward the rod and bonded to an inner peripheral surface of the rod; and
    an opening that opens at a second side of the main body toward a base of the rod; and
a rod plug including:
    a base portion configured to be inserted into the grip body through the opening; and
    a second insertion portion extending from the base portion and bonded to an inner peripheral surface of the first insertion portion; and
wherein the base portion of the rod plug is formed to be larger in diameter than the rod, and a rod plug opening opened laterally is formed.

2. The rear grip structure of a fishing rod according to claim 1, comprising a protective ring that protects the opening of the grip body.

3. The rear grip structure of a fishing rod according to claim 1, wherein a grip opening opened laterally is formed in the grip body.

* * * * *